United States Patent [19]
Hackett et al.

[11] Patent Number: 5,453,598
[45] Date of Patent: Sep. 26, 1995

[54] APPARATUS FOR THE TRANSFER OF ELECTRICAL POWER TO A BALANCER

[75] Inventors: Brian K. Hackett, Saline; Patrick J. McCleer, Jackson, both of Mich.

[73] Assignee: The Balance Dynamics Corporation, Ann Arbor, Mich.

[21] Appl. No.: 51,511

[22] Filed: Apr. 22, 1993

Related U.S. Application Data

[63] Continuation of Ser. No. 590,642, Sep. 28, 1990, Pat. No. 5,231,265.

[51] Int. Cl.⁶ .................................................... H05B 1/02
[52] U.S. Cl. ......................... 219/503; 219/508; 219/494; 307/41
[58] Field of Search ..................... 219/503, 494, 219/508, 494, 491; 307/117, 119, 38–41

[56] References Cited

U.S. PATENT DOCUMENTS

| | | | |
|---|---|---|---|
| 3,311,734 | 3/1967 | Peterson | 219/503 |
| 3,920,956 | 11/1975 | Fado et al. | 219/503 |
| 4,425,511 | 1/1984 | Brosh | 307/106 |
| 5,109,223 | 4/1992 | Schmidt et al. | 307/119 |
| 5,241,298 | 8/1993 | Lian et al. | 307/219 |

*Primary Examiner*—Mark H. Paschall
*Attorney, Agent, or Firm*—John G. Chupa

[57] ABSTRACT

A method and apparatus is disclosed for transferring electrical power to a balancer 14 without the need for a physical connection between the balancer and the power source 16 or the controller 12 and which also provides for data communication between a balancer 14 and a balancer controller 12.

4 Claims, 4 Drawing Sheets

5,453,598

1

APPARATUS FOR THE TRANSFER OF ELECTRICAL POWER TO A BALANCER

This is a continuation of application Ser. No. 590,642 filed on Sep. 28, 1990, now U.S. Pat. No. 5,231,265.

1. Field of the Invention

This invention generally relates to a method and an apparatus for the transfer of electrical power and more particularly, to a method and apparatus for the transfer of electrical power to a balancer and for providing data communications between the balancer and a balancer controller.

2. Discussion

Many types of rotating machines, such as grinding wheels, undergo changes in their state of balance as a consequence of normal usage. Many types of balance correction devices have been created which have employed a variety of balancing methodologies and associated control systems in order to correct the changes in balance. Most of these devices include a balancer which produces the desired balance condition and a balancer controller which controls or directs the balancer so that the balancer is made to achieve the desired balance. One example of such a balance correction device is found in U.S. Pat. No. 4,432,253 filed on Jan. 25, 1982, which is herein incorporated by reference and one example of a balancer controller is found in U.S. patent application Ser. No. 383,925 which was filed on Jul. 21, 1989, and which is also herein incorporated by reference.

With these past balance correction devices, it was necessary to provide an electrical power signal to the balancer components in order to energize various components of the balancer thereby adequately effecting the desired control. Specifically, in many of these aforementioned devices, it was necessary to provide an electrical power signal to a selected heating element in order to effect the necessary fluid transfer within the balancer so as to provide a desired balance.

While many of these past balance correction devices have effectively provided or transferred electrical power to the balancer, they have done so by means of a physical connection between the source of electrical power and the actual balancer itself. This actual physical connection was either in the form of a center point connection along a centralized bus, or by means of a slip ring arrangement. This physical connection between the source of electrical power and the balancer has provided to be relatively bulky and unworkable in situations where the balancer is disposed within a device to be balanced such that the balancer is not physically accessible. That is, this lack of accessibility is such as to prevent any physical connection between the balancer and the electrical power source. This lack of connectivity and access to the balancer has resulted in the failure of many of these past balancers to be used in many needed balancing situations.

Additionally, many of these past balancer devices have also required a physical connection between the balancer and the controller for the transfer or the communication of data therebetween. This transfer of data is needed in order to adequately command or instruct the balancer to perform a needed control function and/or to acquire knowledge of the status or the state of the balancer itself. This physical data connection also prevented many of these balancer devices to be used in situations where the balancer may have been physically inaccessible and has further complicated these balancer devices making them more prone to failure and has resulted in an increase in the overall cost of some of these devices.

SUMMARY OF THE INVENTION

It is, therefore, a primary object of this invention to provide a method and an apparatus for the transfer of an electrical power signal to a balancer without the need for an actual physical connection to the balancer.

It is another object of this invention to provide a method and an apparatus to allow communication between a balancer and a controller without the need for an actual physical connection between the balancer and the controller.

It is a further objection of this invention to provide a method and an apparatus for allowing the communication of data between a balancer and a balancer controller such that the data is defined by varying an electrical power signal which is provided to the balancer and to the controller.

It is yet another object of this invention to provide a balancer controller having a plurality of chambers each having a heating element disposed therein, such that an electrical signal may be selectively applied to one of the heating elements and such that data may be generated by the balancer by the selective disconnection of the electrical signal to the one heating element, for a predetermined period of time.

According to the teachings of the present invention an apparatus may be provided which may be used to provide an electrical power signal to a balancer and to provide for a transfer of balancer data, generated by the balancer to a balancer controller and to further provide for a transfer of controller data generated by the balancer controller to the balancer such that the apparatus comprises an inductor coupled to the electrical power signal and to the balancer, for transferring the electrical power signal to the balancer; a first circuit, coupled to the inductor, for varying the electrical power signal according to the balancer data thereby allowing the balancer data to be transferred to the balancer controller; and a second circuit, coupled as the inductor for varying the electrical power signal according to the controller data thereby allowing the controller data to be transferred to the balancer.

Further objects, features and advantages of the invention will become apparent from the consideration of the following description and the appendant claims when taken in connection with the accompanying drawings.

BRIEF DESCRIPTION OF THE DRAWINGS

Various advantages of the present invention will become apparent to those skilled in the art by reading the following specification in reference to the following drawings in which.

DETAILED DESCRIPTION OF THE INVENTION (I). Transfer of Electrical Power

Figure 1:
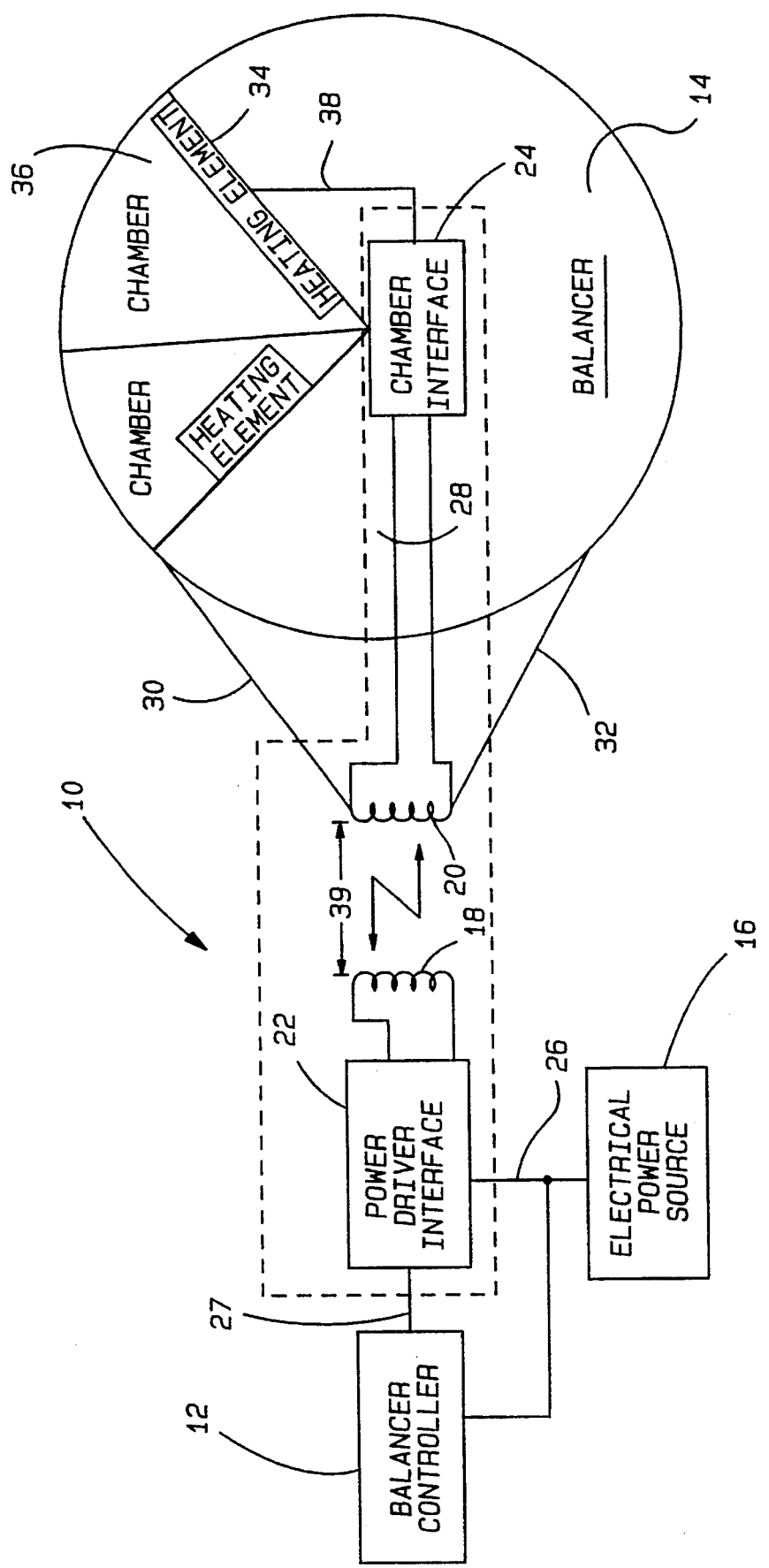
FIG. 1 is a block diagram of a balancer device having an apparatus for the transfer of electrical power to the balancer made in accordance with the teachings of the preferred embodiment of this invention.

Referring now to FIG. 1, there is shown the electrical power transfer apparatus 10 of the preferred embodiment of this invention, coupled to a balancer controller 12, a balancer 14, and to a typical source of electrical power 16. Specifically, apparatus 10 comprises inductors 18 and 20, power driver interface 22, and chamber interface 24. Power driver interface 22 is coupled to electrical power source 16 by bus 26 and to controller 12 by bus 27. Interface 22 transfers the electrical power signal from source 16 to inductor 18 where this electrical power signal is further transferred to inductor 20 by means of the electrical flux communication between inductors 18 and 20. Thereafter, inductor 20 impresses and/or couples this received electrical signal to the chamber interface 24 by means of bus 28. Inductor 20 is further physically mounted to the balancer 14 by the use of typical mounting members 30 and 32. Chamber interface 24 is coupled to each of the heating elements 34 contained within each of the chambers 36 by means of bus 38 and acts to transfer this received electrical power to a selected heating element 34. In the preferred embodiment of this invention, inductor 18 has approximately 40 turns of #12 Litz wire while the inductor 20 has approximately 85 turns of #22 enameled secondary magnetic wire. The spacing 39, between inductors 18 and 20, is approximately 0.25 inches in the preferred embodiment of the invention.

Figure 2:
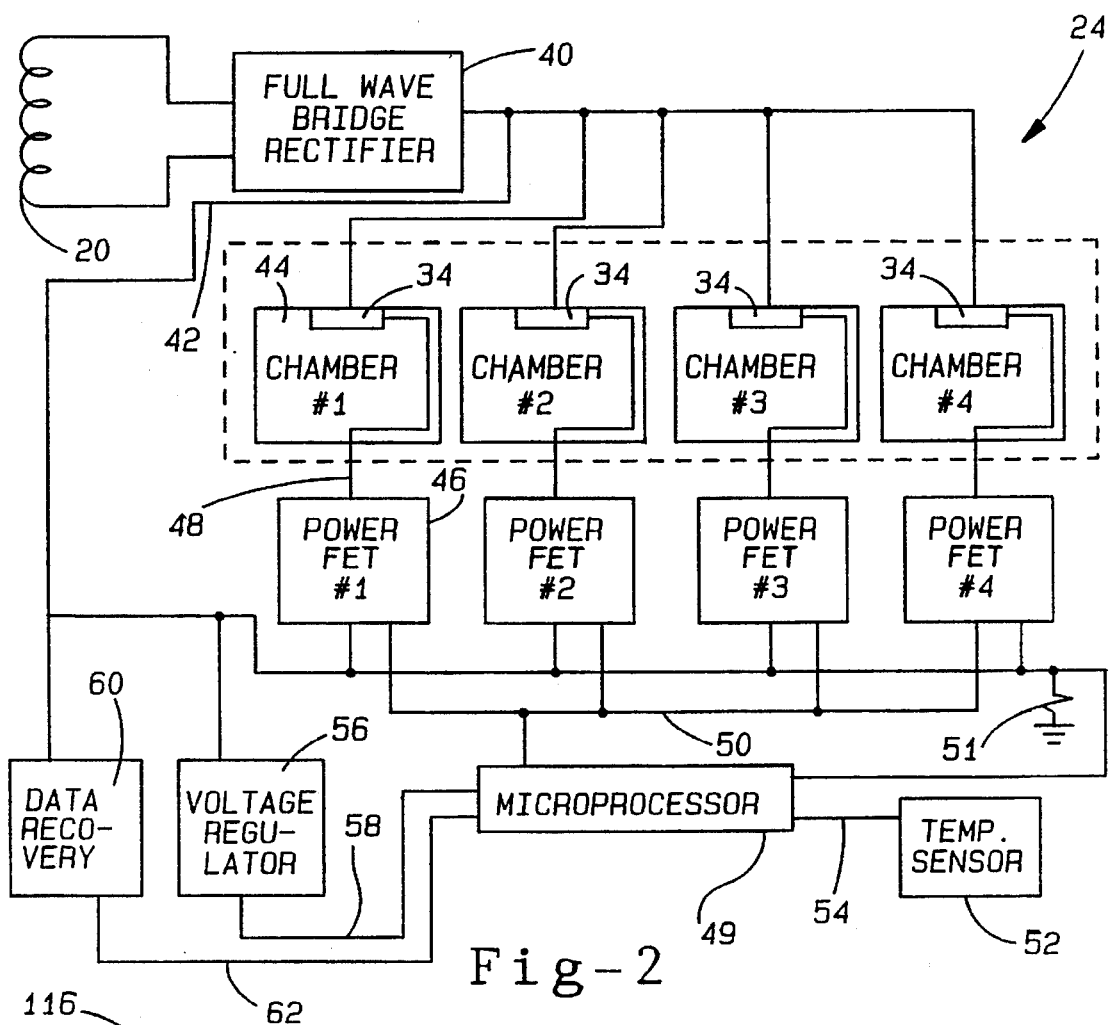
FIG. 2 is a block diagram of the chamber interface made in accordance with the teachings of the preferred embodiment of this invention and shown generally in FIG. 1.
Figure 4:
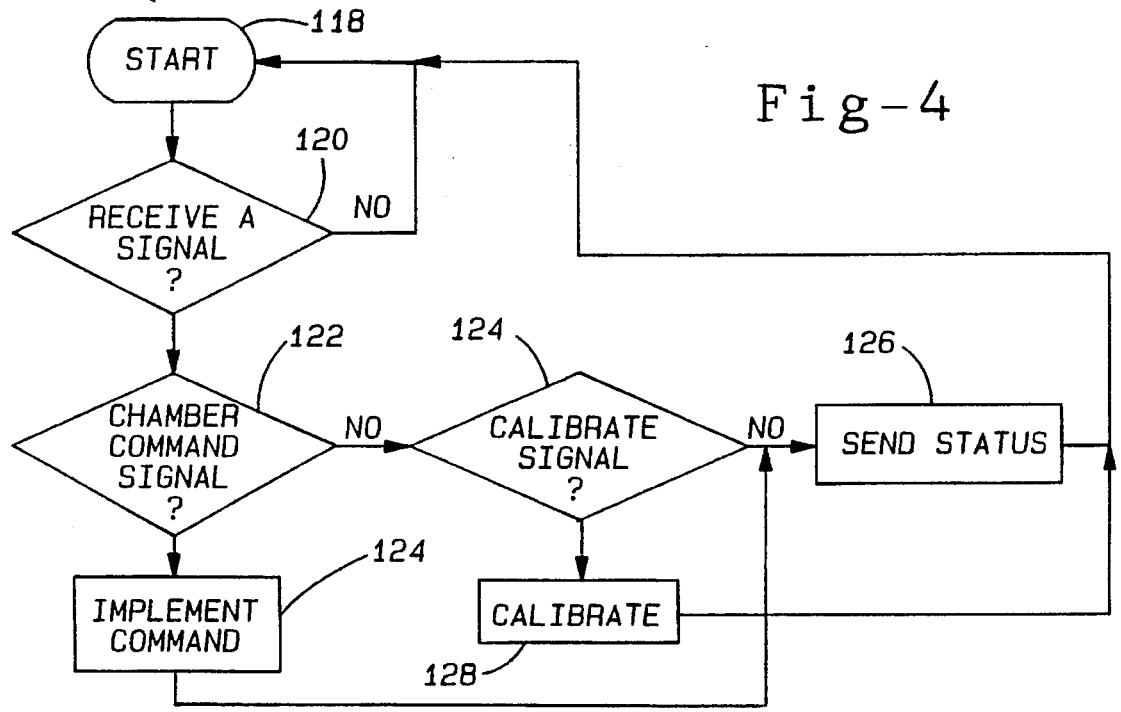
FIG. 4 is a flow chart showing the general operation of the apparatus for the transfer of electrical power to a balancer, made in accordance with the teachings of the preferred embodiment of this invention.

To more fully understand this transfer of electrical power, reference is now made to FIG. 2. That is, upon receipt of the electrical power signal from inductor 18, inductor 20 outputs this electrical signal to the full wave bridge rectifier 40 which rectifies the received electrical power signal such that a direct current type signal is output onto bus 42 and is coupled to each of heating elements 34 disposed within each of the chambers 44. While this power is impressed upon the individual heating elements 34, none of the electrical power flows therethrough due to the coupling of the field effect transistors 46, to each of the heating elements 34 by means of bus 48. That is, each of the individual heating elements 34 is coupled to a unique field effect transistor 46. The output of the rectifier 40 is then applied and flows through the individual heating element 34 only when its uniquely associated field effect transistor 46 is enabled or is activated. If the individual field effect transistor 46, associated with a particular heating element 34 is disabled, then the flow of electrical power to that individual heating element 34 is blocked or prevented and consequently that heating element 34 is not energized.

Further, a microprocessor 49 is coupled to each of the field effect transistors 46 by means of bus 50 and is further coupled to a typical temperature sensor 52 by means of bus 54. The typical temperature sensor 52 is deployed within the balancer 14 so as to record the ambient temperature therein. The ambient temperature is then downloaded to the microprocessor 49, through bus 54, where it is stored by microprocessor 49 and later output therefrom. Additionally, the output of the full wave bridge rectifier 40, along bus 42, is input into a voltage regulator 56 which produces a direct current type output voltage on bus 58 at a level which is characteristic of the type of microprocessor 49. In the preferred embodiment of this invention, microprocessor 49 comprises a model 80C752 microprocessor. Further, a resistor 51 is coupled to bus 42 and to ground while further coupled to microprocessor 49. In this manner, microprocessor 49 may measure the voltage access the resistor 51 which is indicative of the power applied to the activated chamber 44.

Additionally, bus 42 is further coupled to a data recovery apparatus 60 whose output is coupled to microprocessor 49 by bus 62. In the preferred embodiment of this invention, the data recovery apparatus 60 comprises a low pass filter which has a roll off of approximately 200 hertz. The data recovery apparatus 60 then, as will be seen later, receives a varied electrical signal from inductor 18 and filters out components which are not related to the transmitted data while coupling the transmitted data to the microprocessor 49 by means of bus 62. Therefore, it should be realized by one of ordinary skill in the art, that chamber interface 24 comprises the aforementioned field effect transistors 46, rectifier 40, temperature sensor 52, microprocessor 49, data recovery apparatus 60, resistor 51, and voltage regulator 56 and that interface 24 allows electrical power to be applied to only a single heating element 34 by enabling one corresponding field effect transistor 46 by use of a signal or bus 50, emanating from microprocessor 49. In this way, microprocessor 49 ensures that only one heating element 34 is activated at any one time in accordance with the normal operating conditions of the balancer 14 and by means of the voltage appearing across resistor 51, microprocessor 49 may determine the power or the voltage applied to the one activated heating element 34.

(II). Data Communication

Figure 3A:
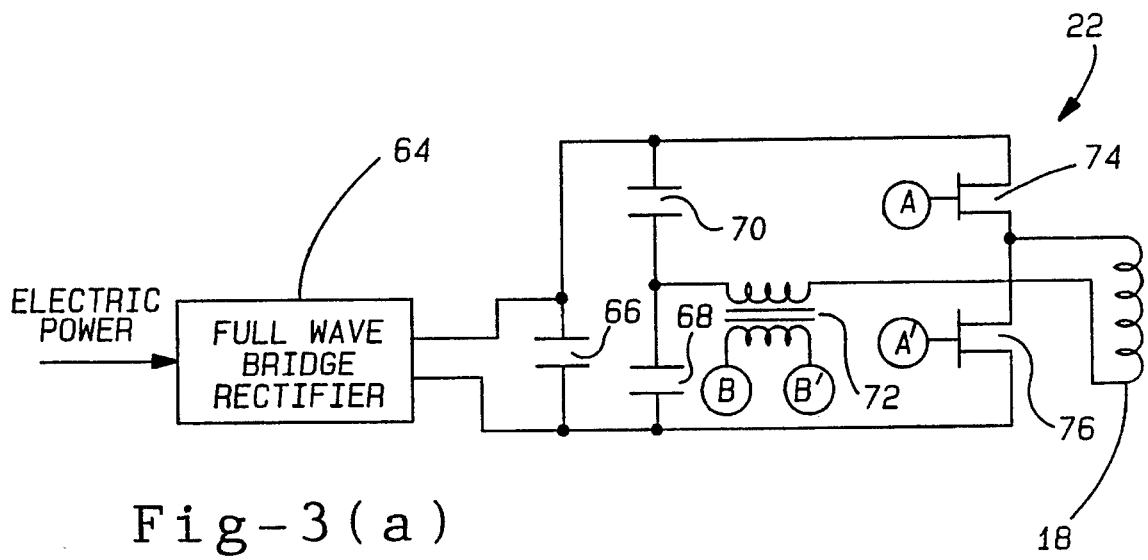
FIGS. 3a–3c are block diagrams of the power driver interface, made in accordance with the teachings of the preferred embodiment of this invention and shown generally in FIG. 1.
Figure 3B:
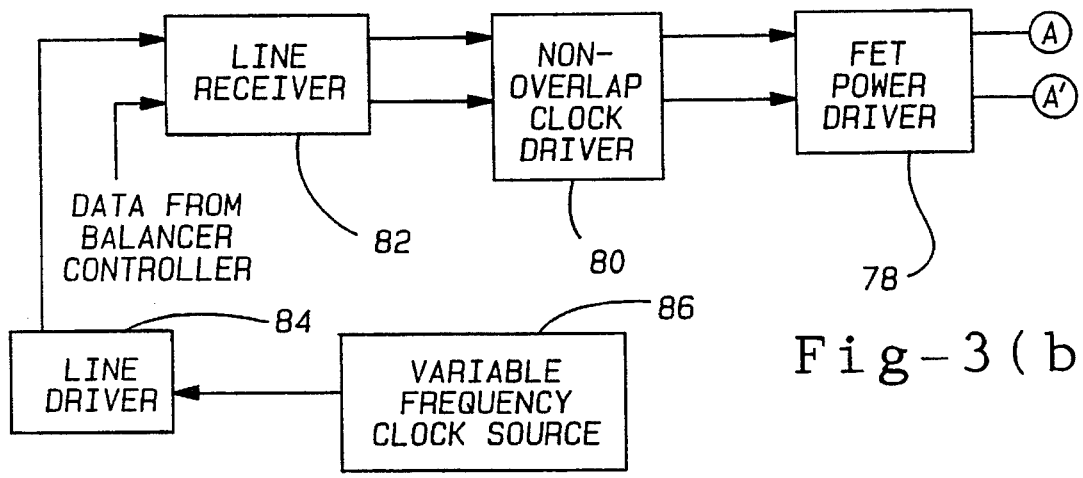

Referring now to FIGS. 3(*a–c*) there is shown the power driver interface 22 as containing a full wave bridge rectifier 64 having outputs coupled to opposite ends of a capacitor 66, which in the preferred embodiment of this invention is approximately 500 microfarads with a 500 volt operating limit. Further, capacitor 66 is connected in parallel with the series connection of capacitors 68 and 70 which are substantially similar, in the preferred embodiment of this invention, each comprising a one microfarad capacitor having a 400 volt operating limit. Further, capacitors 68 and 70 are each, at a single end thereof, coupled to a transformer 72 which is further coupled to inductor 18. Additionally, inductor 18 is coupled to two substantially identical field effect transistors 74 and 76 and capacitors 68 and 70 are also coupled to the field effect transistors 74 and 76 at ends opposite from the coupling to the transformer 72.

Figure 3C:
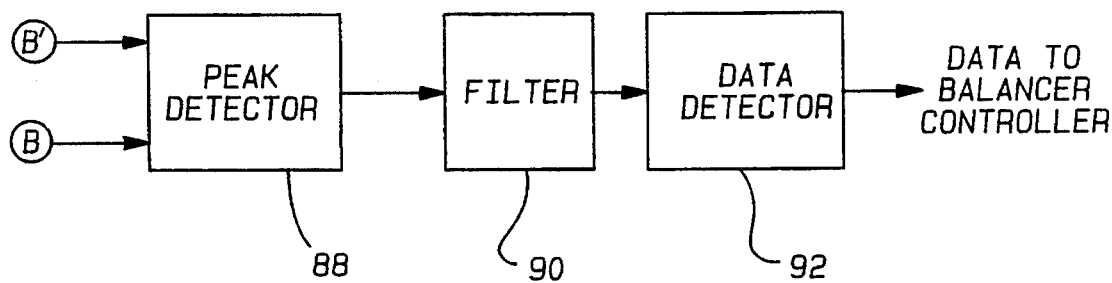

As shown best in FIG. 3(*b*), field effect transistor 74 and 76 are coupled to a power driver amplification apparatus 78 which is itself coupled to a non-overlap clock driver 80. A line receiver 82 is coupled to the non-overlap clock driver 80 and has an input which is coupled to typical data from the balancer controller 12 and has another input which is coupled to a line driver amplifier 84 having an input emanating from a variable frequency clock source 86. As shown best in FIG. 3(c) transformer 72 is coupled to a peak detector 88 having an output coupled to a filter 90 whose output is coupled to a data detector 92. The output of the data detector 92 is coupled to the balancer controller 12.

In operation, the electrical power signal received by the rectifier 64 (from source 16) is transformed to a direct current type of signal and a capacitor 66 acts so as to maintain the voltage level of this received signal at a relatively constant threshold. Capacitor 68 and 70 and field effect transistor 74 and 76 comprise a tuned circuit having, in the preferred embodiment of this invention a resonant frequency of approximately 10 kilohertz. This resonant frequency was found to be advantageous for substantially maximum transfer of electrical power to the balancer from the electrical power source 16. When it is desired to transmit data from the balancer controller 12 to the balancer 14, the data, in the preferred embodiment of this invention, is received by the line receiver 82 along with the output of the variable frequency clock source 86 which is amplified by line driver 84. The line receiver 82 then amplifies the inputs thereto and outputs both the data and the clock into the non-overlap clock driver 80 which outputs both the clock and the data to the power driver 78 and which insures that the data and the clock do not overlap in time. Driver 78 produces a signal to the field effect transistor 74 and 76 which deactivates the field effect transistors 74 and 76 thereby causing a signal to be produced to the inductor 18 which comprises a variation or a modulation of the electrical power signal according to the balancer controller data. After such data is sent, driver 78 causes the transistors 74 and 76 to alternately activate in a manner sufficient to transfer electrical power to inductor 20 which is substantially unaltered. This produced data signal is then communicated to the inductor 12 and this data signal is a variance of the electrical power signal received on bus 26 from the electrical power source 16. That is, the electrical signal is varied according to the data received from the controller 12 and from the received clock signal from source 86. In this manner, data may be transmitted from the balancer controller 12, to the balancer 14, without the need for a physical connection therebetween or some sort of additional communication apparatus.

Figure 6:
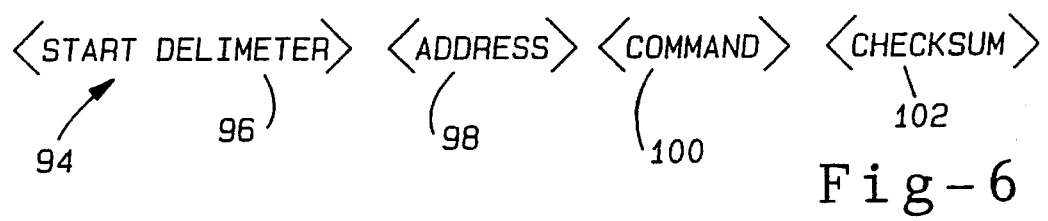
FIG. 6 is a flow chart showing the data format of the data that is transferred from the balancer controller to the balancer according to the teachings of the preferred embodiment of this invention.

Referring now to FIG. 6, there is shown the data format 94 which is transmitted to the balancer 14 and which has a first portion 96 defining a start delimiter or a start of the message and further having a portion 98 which defines a unique address or identification of the individual balancer 14 which is to receive the message. Portion 98 allows multiple balances 14 to be in communication with controller 12 in the manner described herein. The data format 94 further contains a portion 100 which defines the actual command to be performed by the receiving balancer and finally contains a portion 102 which is a typical error correction sum which ensures the validity of the received message. This data format is generated from the variability of the received electrical power signal by means of the tuned circuit defined by capacitors 68 and 70 and field effect transistors 74 and 76 which are driven by the power driver 78 in response to the data and clock signals received from the balancer controller 12. It should be realized by one of ordinary skill in the art therefore, that not only is electrical power transferred to the balancer 14, and more particularly to the individual heating elements 34 therein (for purposes of activating these heating elements 34), but that the same electrical power signal is modified or varied according to data which is desired to be sent to the balancer 14 from the balancer controller 12. In this manner, the balancer 14 may be deployed in an inaccessible place (since no physical connections between balancer 14 and controller 12 are necessary) making the balancer much more adaptable to various balancing situations while maintaining simplicity in overall design.

Figure 5:
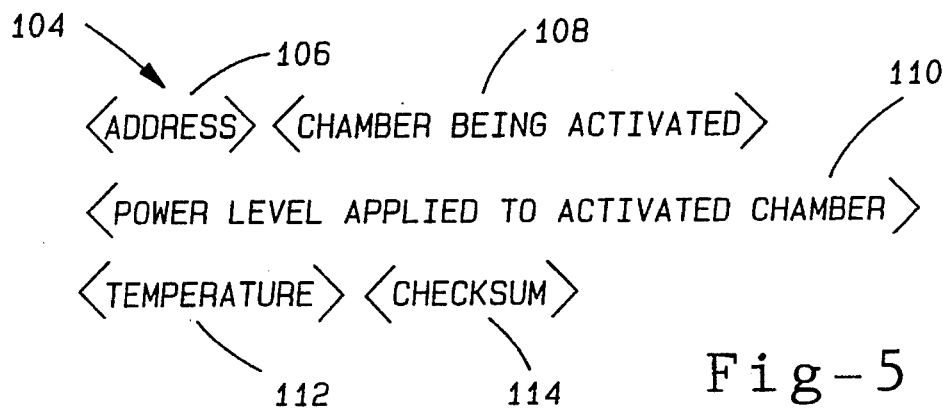
FIG. 5 is a flow chart showing the data format associated with data which is transferred from the balancer to the balancer controller according to the teachings of the preferred embodiment of this invention.

Referring now to FIG. 2, it should be equally apparent to one of ordinary skill in the art that when an individual field effect transistor 46 activates its associated heating element 34 a load is reflected to the inductor 18 by means of the flux communication between the inductor 20 and the same inductor 18. By periodically activating and deactivating the field effect transistor 46, the microprocessor 49 will cause a variation of the flux between the inductors 18 and 20. This flux occurs and/or exists because of the aforementioned transfer of electrical power between the inductors 18 and 20. This variation in the flux is used in the preferred embodiment of the invention, to send or to define data between the balancer 14 and the balancer controller 12. The format for this data is best shown in FIG. 5. Specifically, format 104 contains a portion 106 defining an address or a unique identification of the balancer controller 12 which is to receive the data and further contains a portion 108 which indicates the chambers 38 which contains a heating element 34 which is being activated. Portion 106 allows for multiple controller 12 to be in communication with a balancer 14. Data format 104 further contains a portion 110 which contains a measure of the power level applied to the activated chambers 38 and contains a portion 112 having the temperature data from the temperature sensor 52. Additionally, data format 104 contains a portion 114 which defines the error summation or "check-sum" associated with the data in the format 104. This defined data format 104 is then transmitted to the balancer controller 12 by the selective activation and deactivation, for a predetermined period of time, of one of the field effect transistors 46 by the microprocessor 49 by means of an enabling signal along bus 50. In this manner data may be transferred, from the balancer 14 to the controller 12, without the need for physical connection therebetween and making the device 10 much more adaptable to various balancing situations.

(III). Microprocessor Operation

Figure 7:
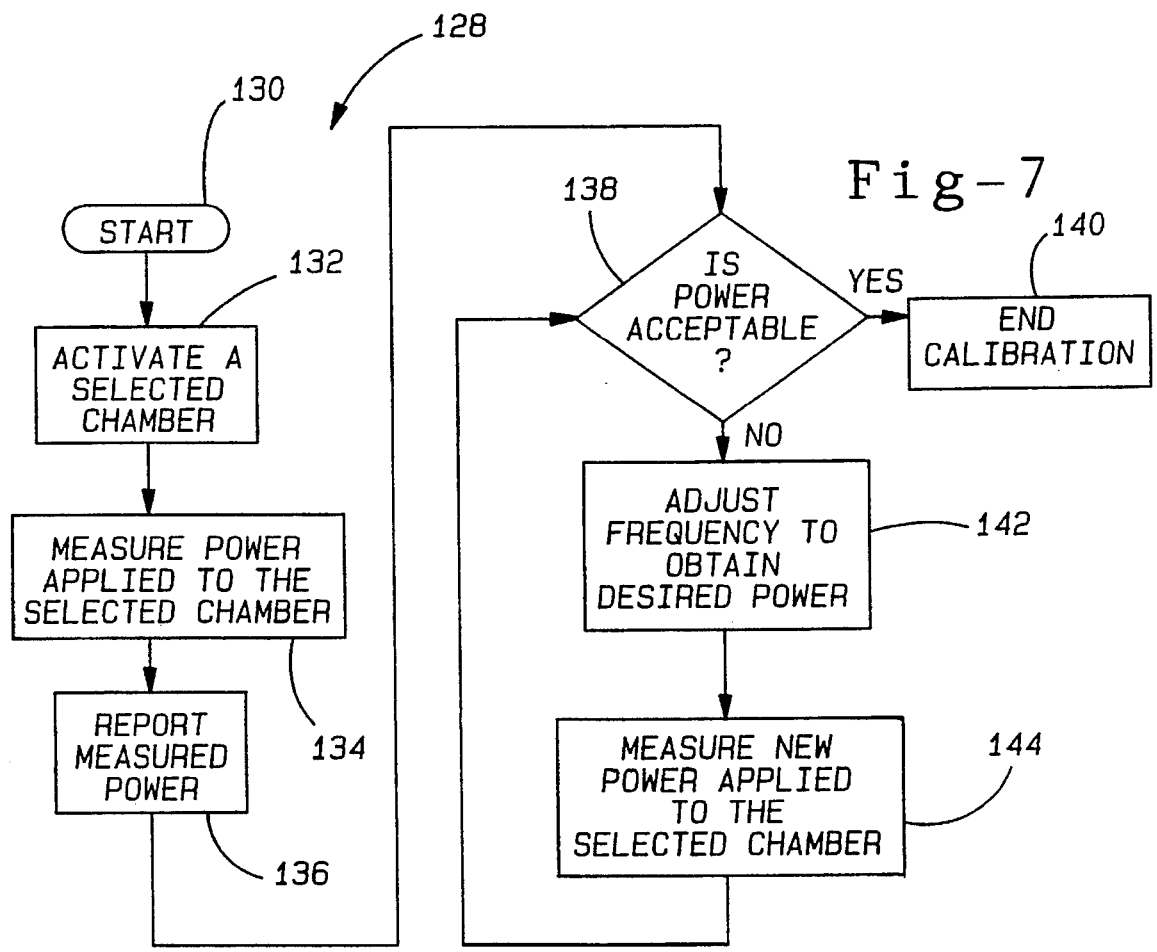
FIG. 7 is a flow chart showing the sequence of steps associated with the calibration or the turning of the frequency of the electrical power signal which is applied to the balancer, according to the teachings of the preferred embodiment of the invention.

Referring now to FIG. 7, there is shown a flow chart 116 containing a sequence of steps associated with the microprocessor 49, which in the preferred embodiment of this invention is under stored program control. Specifically, step 118 defines the start of operation of the microprocessor 49 and is followed by a step 120 which requires the microprocessor 49 to determine if a signal or more specifically, if data has been received from the balancer controller 12. If such data has not been received, then the microprocessor 49 re-enters the start step 118 and waits for the receipt of data. If such data has been received, step 120 is then followed by step 122. Specifically, step 122 requires the microprocessor 49 to determine if the data received from the balancer controller 12 was related to the activation or deactivation of one of the heating elements 34. If this data, contained in portion 100 of the data format 94, was indeed related to a heating element 34 then step 122 is followed by step 124 and the microprocessor 49 activates or deactivates one of the chambers associated with the balancer 24, according to the received data. The data may also be such so as to require microprocessor 49 to disable all of the field effect transistors 46 within the balancer 14. Thereafter, step 124 is followed by step 126 which requires the microprocessor 49 to selectively activate and then deactivate, for a specific period of time, one of the field effect transistors 46 such that status information is sent to the balancer controller 12. Such status information contains the information contained in data format 104.

If, in step 122, the received data did not contain a command related to one of the heating elements 34, then step 122 is followed by step 124 which requires the microprocessor 49 to determine if the data so received required the microprocessor to calibrate or to tune the frequency of the electrical power signal emanating from the power source 16. If this is the case, then step 124 is followed by step 128 which requires this calibration. This calibration will be further explained by reference to FIG. 7. Step 128 is then followed by step 118. If the microprocessor determines, in step 124, that such a calibration or tuning signal has not been received, then step 124 is followed by step 126 which required the microprocessor to send status associated with the data format 104 shown in FIG. 5 and step 126 is then followed by 118. Additionally, the status shown in data format 104 may be made to be sent upon virtually any condition including upon a predetermined time after a field effect transistor 46 has been activated.

Referring now to FIG. 7, there is shown calibration flow chart having a sequence of steps associated with the calibration step 128 of flow chart 116. Specifically, the initial step 130 is followed by step 132 which requires the microprocessor 49 to activate one of the field effect transistors 46 associated with a selected heating element 34 in a selected chamber 44. Then, step 132 is followed by step 134 which requires that microprocessor 49 to read the measured voltage/power applied to the selected heating element 34 within the selected chamber 44. This is done by measuring the voltage across resistor 51. This measured voltage may be used to calculate the power applied to the selected chamber 44. This calculated power is then reported in step 136 to the balancer controller 12 by means of a data transfer previously described. Thereafter, the microprocessor 49 must wait for a determination if the power level is acceptable in step 138 and if this power level was found to be acceptable by the balancer controller 12 or by the microprocessor 49 then calibration is ended and step 140 is entered into.

If the power level was not found to be acceptable either by the balancer controller 12 or by the microprocessor 49 itself, then step 138 is followed by step 142 which requires the frequency of the electrical power signal to be adjusted in order to obtain the desired power. This adjustment may occur in a variety of ways including by the addition of a frequency dependent component which is placed within the tuned circuit defined by capacitors 68 and 78 transistors 74 and 76 and which is activated by the balancer controller 12 upon proper notification by the balancer 14. Step 142 is then followed by step 144 which requires the microprocessor 49 to measure the new power applied to the selected chamber 44, and more particularly, to the heating element 34 disposed therein. Step 144 is then followed by step 138 which requires the microprocessor 49 or the balancer controller 12 to determine if the new power is appropriate.

As will be understood by one of ordinary skill in the art, the foregoing invention allows for the transfer of electrical power and data to a balancer without the need for a physical connection between the balancer and the power source and/or to the controller. Additionally, data may also be transferred from the balancer to the controller in the like manner and the data may be produced by varying the electrical power signal.

It is to be understood that the invention is not limited to the exact construction or method illustrated and described above, but that various changes and modifications may be made without departing from the spirit and scope of the invention as defined in the following claims.

We claim:

1. An apparatus for transferring electrical power and data to a device, said apparatus comprising:

a first electrical coil positioned upon said device;

a second electrical coil positioned a certain distance from said first electrical coil and coupled to an electrical power signal, said second coil being effective to transfer said electrical power signal to said first coil;

data means coupled to said second electrical coil, for selectively varying the electrical power signal which is transferred to said second coil.

2. The apparatus of claim 1 wherein said first and second electrical coils are separated by an air gap.

3. The apparatus of claim 1 wherein said data means comprises:

a tuned circuit having a resonant frequency of approximately 10 khz.

4. The apparatus of claim 1 further comprising second data means, coupled to said device, for selectively varying the electrical power signal which is transferred to said second coil.

\* \* \* \* \*